United States Patent [19]

Mirza et al.

[11] Patent Number: 5,512,073
[45] Date of Patent: Apr. 30, 1996

[54] GREASE FILTER ASSEMBLY

[75] Inventors: Daryl Mirza, Zion; Robert A. Barasa, Lake Forest, both of Ill.

[73] Assignee: DGA Industries, Inc., Zion, Ill.

[21] Appl. No.: 293,154

[22] Filed: Aug. 19, 1994

[51] Int. Cl.[6] .................................................. B01D 35/00
[52] U.S. Cl. ................................ 55/323; 55/486; 55/494; 55/DIG. 36; 126/299 R; 454/49; 454/366
[58] Field of Search ............................. 55/323, 486, 487, 55/493, 494, 501, DIG. 36; 126/299 D, 299 E, 299 R, 300, 301; 454/49, 341, 365, 366

[56] References Cited

U.S. PATENT DOCUMENTS

| | | | |
|---|---|---|---|
| 143,339 | 9/1873 | Frazer | 55/493 |
| 1,090,026 | 3/1914 | Chillis | 55/493 |
| 2,847,085 | 8/1958 | Ehlers | 55/493 |
| 3,566,585 | 3/1971 | Voloshen et al. | 55/435 |
| 3,660,969 | 5/1972 | Fox | 55/385 |
| 3,695,164 | 10/1972 | Stalker | 98/115 |
| 3,760,566 | 9/1973 | Zievers et al. | 55/223 |
| 4,323,373 | 4/1982 | Fritz | 55/96 |
| 4,325,290 | 4/1982 | Wolfert | 98/42 A |
| 4,350,504 | 9/1982 | Diachuk | 55/217 |
| 4,450,756 | 5/1984 | Kling | 98/115 R |
| 4,610,705 | 9/1986 | Sarnosky et al. | 55/316 |
| 4,635,617 | 1/1987 | Simonsen | 126/299 |
| 4,673,423 | 6/1987 | Yumlu | 55/319 |
| 4,869,236 | 9/1989 | Blough | 126/299 R |
| 4,887,588 | 12/1989 | Rial | 126/299 R |
| 4,923,725 | 5/1990 | Zafiroglu | 428/36.4 |
| 5,078,047 | 1/1992 | Wimberly | 454/366 |
| 5,196,040 | 3/1993 | Malloy et al. | 55/323 |
| 5,318,607 | 6/1994 | Malloy et al. | 55/323 |

OTHER PUBLICATIONS

Grainger Industrial and Commercial Equipment and Supplies, Fall 1993 General Catalog, No. 384, pp. 2707, 2708, 2710.

Undated brochure entitled "Cook's 'Grease Terminator'", Loren Cook Company.

Unnumbered and undated page from Grease Guard, Inc. brochure and captioned "Don't Let Grease Damage Soak Up Your Profits!".

Unnumbered and undated page from Grease Guard, Inc. brochure captioned "Grease Guard™ Meets the 'Competition'".

Unnumbered and undated page captioned "Accessories & Options".

Unnumbered and undated page captioned "Direct and Belt Drive Upblast Centrifugal Roof Exhausters Models CUE and CUBE".

Primary Examiner—C. Scott Bushey
Attorney, Agent, or Firm—Fitch, Even, Tabin & Flannery

[57] ABSTRACT

A grease filter assembly is provided for absorbing airborne grease discharged from a grease discharge vent extending from a roof. A support frame is mountable to the duct of the grease discharge vent and grease absorbing pads are supportable upon the support frame in stationary position surrounding the discharge vent and in spaced relation from the roof. The support frame includes support rods mounted adjacent respective sides of the discharge vent duct and extending beyond their respective duct sides to overlap at the corners of the duct and thereby provide a supporting grid including the end portions of each of two rods extending from adjacent walls of the duct. A plurality of grease absorbing pads are supported on the supporting grid disposed adjacent respective sides of the duct. The pads being of sufficient length to extend beyond the duct sides on both ends so that pads disposed at adjacent sides of the duct overlap one another at the corners of the duct. U-shaped retaining clips are slid onto the ends of each of the rods and have a lower aperture through which the retaining clips are slid onto the ends of the rods, with the edges of the overlapping pads being received in the channel of the retaining clips. Tension cords extend between pairs of oppositely disposed retaining clips to retain the pads in engagement with the support frame and to bias the pads into abutment with respective sides of the duct.

17 Claims, 5 Drawing Sheets

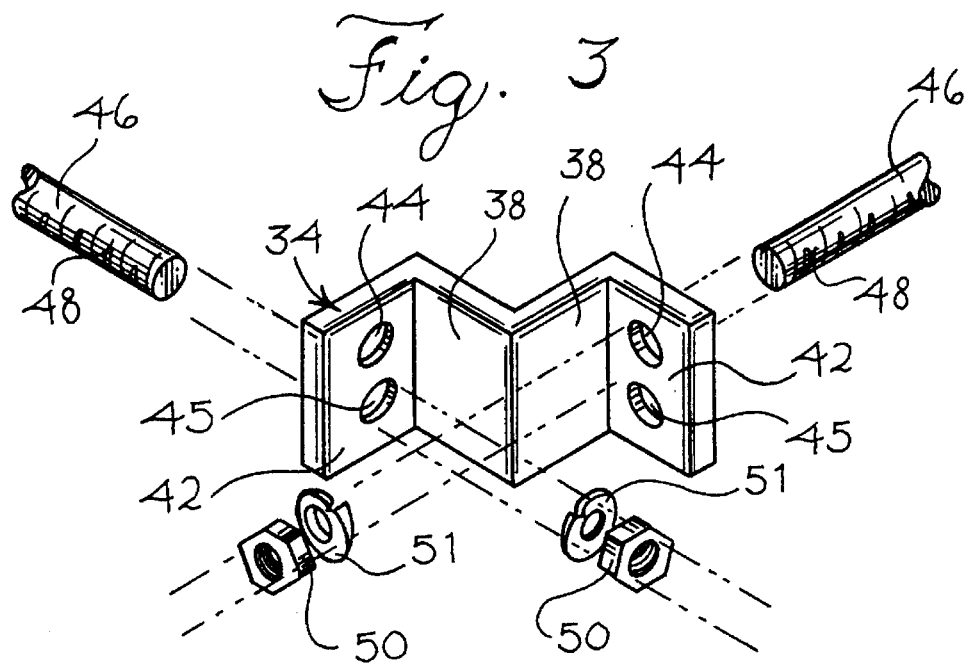
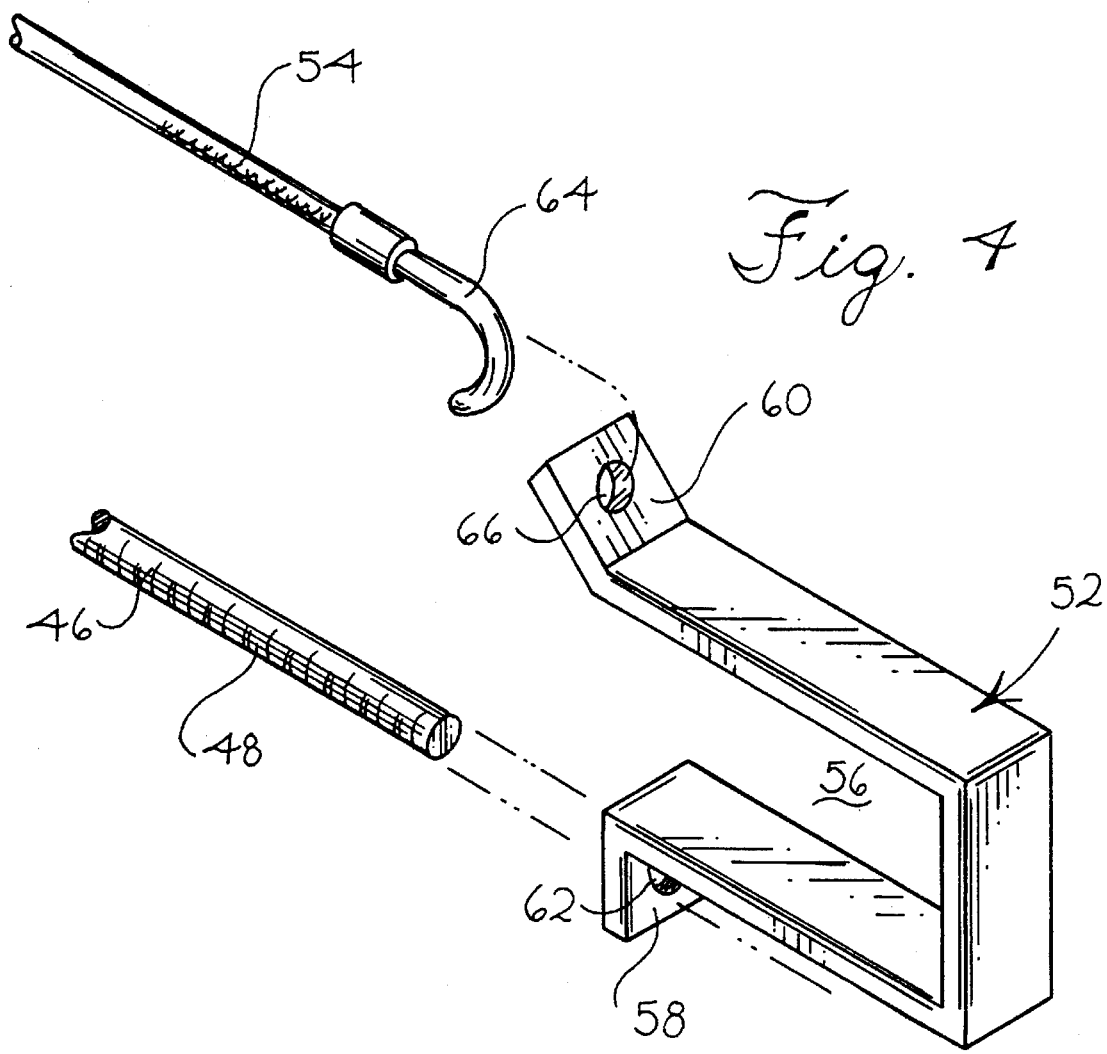

GREASE FILTER ASSEMBLY

FIELD OF THE INVENTION

The present invention pertains to filter assemblies for collecting airborne grease discharged from vents.

BACKGROUND OF THE INVENTION

Many facilities, such as restaurants, have production processes which require the discharge of high volumes of grease through roof-mounted discharge vents. The discharged grease may accumulate on the roof and cause deterioration of the roofing materials surrounding the grease discharge vent, including the flashing and gaskets associated with the vent installation. These roofing materials are typically organic materials which may deteriorate rapidly when exposed to grease. Various filters and grease traps disposed between the grease generating source and the discharge vent have been used to reduce the quantity of airborne grease discharged from the discharge vent. However, such devices have been unsuccessful in absorbing or trapping all of the grease, and even when such filters are employed, a significant amount of grease is still discharged from the discharge vent and onto the roof. Thus, there is a need for a filter assembly for absorbing or trapping grease discharged from roof-mounted discharge vents.

One such filter assembly is disclosed in U. S. Pat. No. 5,196,040 entitled "Grease Trap and Filter Apparatus". This patent discloses a frame structure which is mounted directly to the roof through which the discharge vent projects. Grease absorbing material has a central portion cut out corresponding to the specific shape of the discharge vent. The grease absorbing material is disposed inwardly of the roof-mounted frame structure, surrounding the discharge vent. This roof-mounted design suffers numerous shortcomings. Among the shortcomings associated with the patented roof-mounted design is that the frame structure is mounted directly to the roof. While the roof-mounted frame may be suitable for those applications in which the roof section immediately surrounding the discharge vent is flat and extends substantially perpendicularly with respect to the discharge vent extending therefrom, the roof-mounted frame does not lend itself to use in the wide variety of applications in which the roof section surrounding the discharge vent is angled with respect to the discharge vent extending from the roof section. There is a need for a filter assembly which is well suited for any type of roof surface or roof configuration.

Another shortcoming associated with the roof-mounted frame structure of the patented design is that it is not suitable for use with tall discharge vents which extend a substantial distance from the roof. The roof-mounted frame structure may be disposed too far away from the high, grease discharging end of the discharge vent to catch the airborne grease before it blows beyond the confines of the frame structure and onto the roof. There is a need for a filter assembly which catches grease discharged from a discharge vent regardless of the height which the discharge vent extends from the roof.

A still further shortcoming associated with the aforementioned patented device is the requirement that the grease absorbing material be cut specifically for each different application to correspond to the particular shape of that specific discharge vent. That is, the grease absorbing material is disposed inwardly of the frame structure and between the frame structure and the discharge vent, requiring that the grease absorbing material be cut accurately to fit snugly between the frame and the periphery of the discharge vent. There is a need for a filter assembly which lends itself to use with discharge vents of a wide variety of shapes and sizes, without requiring cutting of the grease absorbing material to correspond to each separate specific shape and sizes.

Moreover, the aforementioned patented device requires screwing or nailing flashing onto the discharge vent duct itself to properly secure the grease absorbing device in place. Many municipal codes prohibit screwing into the duct stack. Therefore, there is a need for a grease filter device which is mountable to a grease discharge vent in a secure, stationary position while maintaining the integrity of the discharge vent duct.

There is a need for a filter assembly which overcomes each of the aforementioned shortcomings of the prior art construction, and which also lends itself to inexpensive production and allows for easy removal and replacement of used grease absorbing materials.

SUMMARY OF THE INVENTION

In accordance with the present invention, a filter assembly for absorbing or trapping grease from a grease discharge vent is provided which is mountable directly to the discharge vent duct, rather than being mountable to the roof itself. This allows the same filter assembly to be employed regardless of the specific type or configuration of the roof section at the discharge vent. For high or tall discharge vents, the filter assembly may be mounted to the discharge vent closely adjacent the grease discharging end of the vent so that the large distance between the grease discharging end of the vent and the roof is not detrimental to satisfactory grease absorption, as there is little space for the discharged grease to fall or be blown before striking the grease filter assembly. Still further, rather than being disposed between an outer frame and the periphery of the discharge vent as in prior art roof-mounted structures, which require cutting the grease absorbing material to correspond to the specific shape and size of each different discharge vent, the filter assembly of the present invention provides a support frame upon which grease absorbing pads rest, and beyond which the grease absorbing pads may extend, so that the grease absorbing pads do not have to be cut specific to each application. Additionally, the filter assembly is mountable to the discharge vent at any height therealong by clamping about the discharge vent, without the need for screwing or nailing into the discharge vent duct.

More specifically, the filter assembly of the present invention comprises a support frame having a plurality of support rods for being positioned generally horizontally adjacent respective sides of the discharge vent duct. The support frame further comprises a plurality of mounting brackets which are mountable at respective corners of the discharge vent duct with each mounting bracket having a pair of rod receiving apertures for receiving and supporting a respective pair of the support rods in substantially perpendicular relation to one another at the corners of the discharge vent duct. The ends of the rods are threaded and nuts are screwed onto the threaded ends of the rods to pull the mounting brackets toward one another to clamp the mounting brackets and support rods about the discharge vent in a stationary position. Hence, the mounting brackets and support rods define a support frame secured in spaced relation from the roof through which the discharge vent duct extends. The support rods are longer than their respective sides of the discharge vent duct, and the end portions of the rods extend beyond both ends of their respective duct sides to provide a supporting grid consisting of the end portions of each of two rods extending from adjacent walls of the duct. A plurality of grease absorbing pads are freely supportable on top of the support rods adjacent respective sides of the discharge vent duct and in spaced relation from the roof. Retaining clips, each defining a generally U-shaped channel, are engageable with respective support rods, with the edges of respective grease absorbing pads being received in the channels of the retaining clips. Tensioning cords are provided for spanning the retaining clips which are disposed on opposite sides of the discharge vent from one another to pull the pair of oppositely disposed retaining clips toward one another, together with the grease absorbing pads disposed in the channels of the retaining clips, to maintain the grease absorbing pads received in the channels of the retaining clips in abutment with respective sides of the discharge vent. Hence, the grease filter assembly securely supports a plurality of grease absorbing pads about the grease discharge vent duct adjacent the grease discharging end of the grease discharge vent and in spaced relation from the roof so that discharged grease falls immediately onto the grease absorbing pads. Since the pads rest upon the support structure, disengagement of the tensioning cords and removal of the retaining clips is all that is required to facilitate simple removal of soiled grease absorbing pads for disposal. Replacement with new grease absorbing pads is easily and rapidly carried out by sliding the retaining clips back onto their respective support rods and reattaching the tension cords.

BRIEF DESCRIPTION OF THE DRAWINGS

In the drawings, wherein like elements are referenced alike:

FIG. 3 is an enlarged perspective view of a mounting bracket of the grease filter assembly of FIG. 1 embodying various features of the present invention;

FIG. 4 is an enlarged perspective view of a retaining clip of the grease filter assembly of FIG. 1 embodying various features of the present invention;

DETAILED DESCRIPTION OF THE PREFERRED EMBODIMENTS

Figure 1:
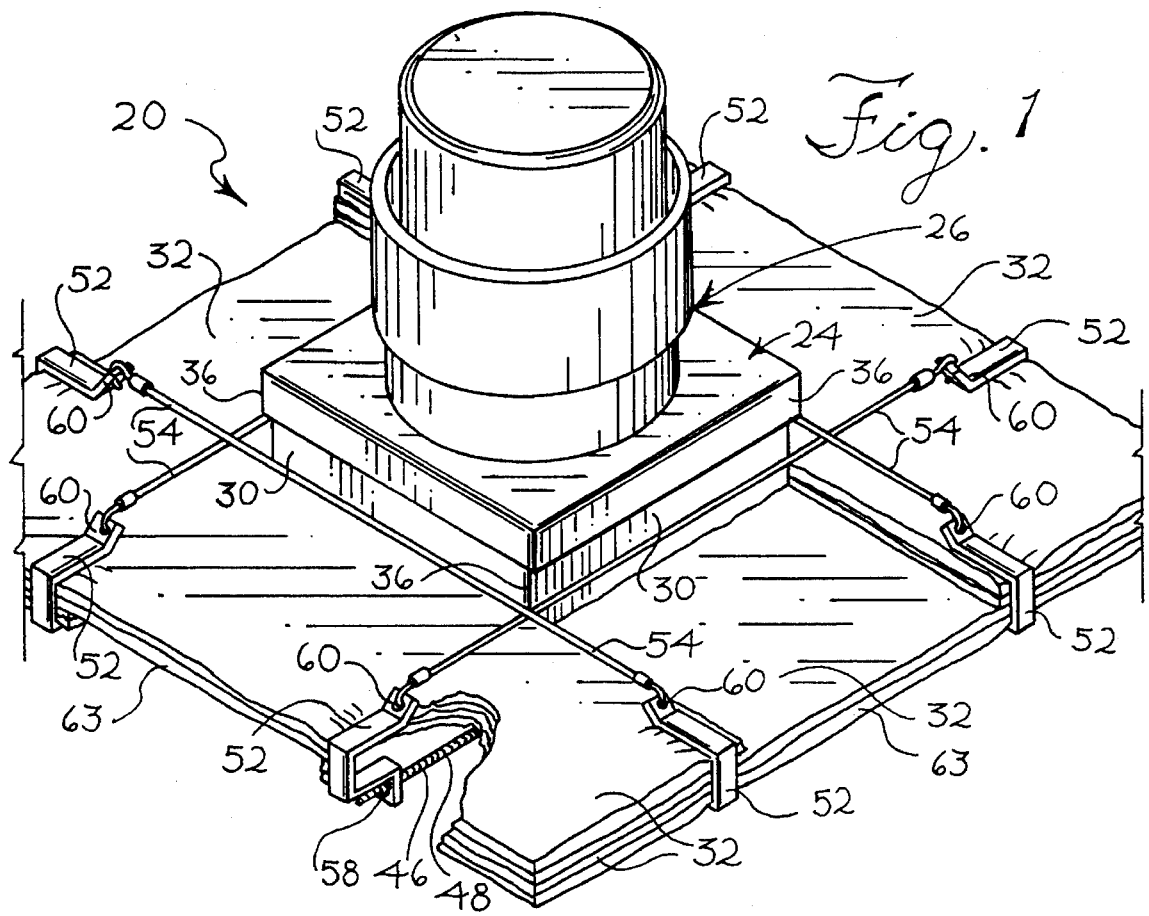
FIG. 1 is a perspective view of a grease filter assembly embodying various features of the present invention, shown mounted to a grease discharge vent duct.

A filter assembly embodying various features of the present invention is illustrated in FIG. 1, and referred to generally by reference numeral 20. The grease filter assembly 20 comprises a support frame, referred to generally by reference numeral 22, which mounts to the duct 24 of a grease discharge vent 26 in spaced relation from the roof 28 through which the discharge vent extends. Grease absorbing pads 32 are supportable on the support frame 22 adjacent respective walls 30 of the duct 24 and retained in position on the support frame 22 surrounding the discharge vent duct 24 by pad retaining means as described below. Since the support frame 22 mounts to the discharge vent duct 24 rather than the roof 28, the filter assembly 20 of the present invention is well suited for employment with any type of roof surface or roof configuration. Also, because the support frame 22 mounts to the duct 24 rather than the roof 28, the grease absorbing pads 32 may be supported directly beneath the discharge vent 26 regardless of the height which the grease discharge duct 24 extends from the roof 28. Furthermore, since the grease absorbing pads 32 are supported upon the support frame 22 each adjacent a respective side 30 of the discharge vent duct, rather than being disposed within the periphery of a support frame as in the prior art, it is not necessary to cut or otherwise customize the shapes of the grease absorbing pads 32 to accommodate differently shaped and sized ducts 24. Still further, the support frame clamps about the discharge vent duct so that it is not necessary to screw or nail into the discharge vent duct. These and other advantages over prior art grease absorbing filter assemblies are provided in a filter assembly 20 which is inexpensive, easy to install, and lends itself to simple and rapid replacement of soiled grease absorbing materials.

Figure 2:
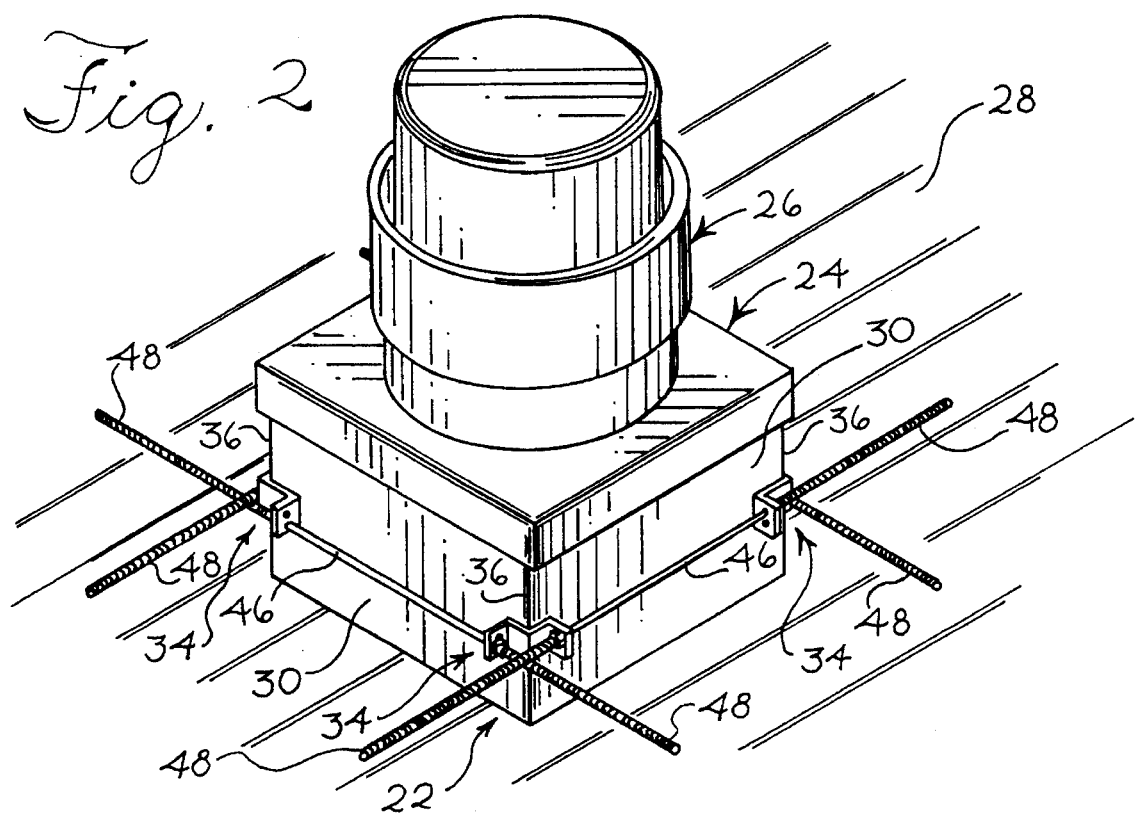
FIG. 2 is a perspective view of mounting brackets and rods mounted to a grease discharge vent duct to form a support frame, with grease absorbing pads freely supported on the support frame indicated in skeleton.

More specifically, with reference to FIG. 2, the support frame 22 comprises mounting brackets 34 for mounting at respective corners 36 of the discharge vent duct 24. As seen in FIG. 3, the mounting brackets 34 are each integral components having a pair of perpendicularly extending walls 38 for being positioned flush against respective walls 30 of the discharge vent duct 24 at its corners 36. The mounting brackets 34 also have a pair of flanges 42 extending perpendicularly from respective ends of the pair of walls 38. Hence, with a mounting bracket 34 mounted at a corner 36 of the duct 24, each of the pair of flanges 42 extends substantially perpendicularly from a respective wall 30 of the duct 24. As best seen in FIG. 2, with mounting brackets 34 mounted at each of the four corners 36 of the duct 24, each wall 30 of the duct 24 has two flanges 42 extending substantially perpendicularly therefrom, with one flange 42 near either end of each wall 30 of the duct 24.

Each of the flanges 42 of the mounting brackets 34 has a pair of vertically offset rod-receiving apertures 44 and 45 for receiving support rods 46 adjacent respective walls 30 of the duct 24. As discussed above, with mounting brackets 34 at each corner 36 of the duct 24, each wall 30 of the duct 24 has a pair of mounting bracket flanges 42 extending perpendicularly therefrom. Support rods 46 are received in the respective rod-receiving apertures 44 and 45 of the pair of flanges 42 extending from each wall 30 of the duct 24 to support the support rods 46 adjacent respective walls 30 of the duct 24. The support rods 46 are made longer than the width of the duct walls 30 against which they are disposed so that the end portions 48 of the support rods 46 extend beyond the ends of the respective walls 30 of the duct 24 to thereby provide a supporting grid consisting of the end portions 48 of each of the two support rods 46 extending from adjacent walls 30 of the duct 24, as seen in FIG. 2.

It will now be appreciated that the pairs of vertically offset rod-receiving apertures 44 and 45 prevent interference of the rods 46 at the corners 36 where the rods 46 cross one another. That is, the pair of flanges 42 extending outwardly from respective opposite walls 30 of the duct 24 receive respective support rods 46 through their upper apertures 44, the pairs of flanges 42 extending outwardly from the other pair of opposite walls 30 of the duct 24 receive respective support rods 46 through their lower apertures 45 so that these support rods extend beneath the first pair of support rods 46 at the duct corners 36. The provision of a pair of vertically offset rod-receiving apertures 44 and 45 in each flange 42 of the mounting brackets 34 allows the same mounting brackets 34 to be used at each of the corners 36 of the duct 24 without concern for whether a support rod is to be disposed above or below another support rod at the corners, which significantly facilitates rapid assembly of the support frame 22.

In the illustrated embodiment, at least the end portions 48 of the support rods 46 are threaded, and nuts 50 or other threaded members are threadably engaged with the support rods 46 to clamp the mounting brackets 34 and support rods 46 to the duct. The nuts also prevent lateral displacement of the support rods 46 with respect to their mounting brackets 34. Following insertion of the support rods 46 into their respective pairs of rod-receiving apertures 44 or 45 of the mounting brackets 34, nuts 50 are screwed onto either end of the support rods 46 and screwed into abutment with respective flanges 42 of the mounting brackets 34 to secure the support rods 46 in stationary position adjacent respective sides 30 of the duct 24. The nuts 50 are tightened to draw respective pairs of mounting brackets 34 toward one another to securely clamp the mounting brackets 34 and support rods 46, which define the support frame 22, in a stationary position on the discharge vent duct. Accordingly, the support frame 22 is mounted to the discharge vent duct 24 in a secure, stationary position without screwing or nailing into the discharge vent duct 26, so that the integrity of the discharge vent duct is maintained. Lock washers 51 may be employed inwardly of the nuts 50 to prevent loosening of the nuts. Manifestly, a wide variety of other means for retaining stationary engagement between the support rods 46 and the mounting brackets 34 are well known to those skilled in the art and may be used in place of, or in addition to, the nuts 50 without departing from the invention.

Accordingly, at this stage of assembly, a support frame 22 is provided which is mounted to the grease discharge vent duct 24 at any position along the duct 24. Hence, the support frame 22 may be positioned in spaced relation from the roof 28 through which the discharge vent duct 24 protrudes. This makes the shape and composition of the roof immaterial to mounting and usage of the filter assembly 20; whereas, with roof-mounted structures of the prior art, the configuration and composition of the roof greatly affects the mounting and usage of the prior art roof-mounted filter assemblies. For instance, roof-mounted structures do not lend themselves to application with tiled roofs or roofs having gravel, or roofs which are angled significantly with respect to the discharge vent; whereas the grease filter assembly of the present invention is well suited for any and all of these roof conditions. Once the support frame 22 is mounted to the discharge vent duct 24, it remains mounted to the duct as a semi-permanent fixture to which grease absorbing materials such as the pads 32 may be mounted and removed as required with the support frame 22 remaining in stationary position mounted to the duct 24.

A plurality of grease absorbing pads 32 are each supportable on top of the support frame 22 adjacent respective sides 30 of the duct 24. The grease absorbing pads 32 are made longer than the sides 30 of the duct 24 against which they are disposed, so that the pads 32 overlap one another at the corners 36 of the duct 24 as shown in FIG. 1. For the rectangular duct 24 illustrated in the drawings, four pads 32 are employed. Preferably, a first pair of pads 32 are positioned adjacent a first pair of opposite sides 30 of the duct 24, and then a second pair of pads 32 are positioned adjacent the remaining pair of opposite sides 30 of the duct 24, with the end portions of the second pair of pads overlapping the end portions of the first pair of pads as shown in FIG. 1. More specifically, the first pair of grease absorbing pads 32 are supportable on both of the end portions 48 of a first pair of oppositely disposed support rods 46 which extend beyond their respective walls 30 of the duct 24. A second pair of grease absorbing pads 32 are supportable on both of the end portions 48 of the first pair of grease absorbing pads 32 as well as the end portions of the first pair of pads 32. Accordingly, the support frame 22 supports the grease absorbing pads 32 in surrounding relation about the discharge vent duct 24 and in spaced relation from the roof 28. The grease absorbing pads 24 are preferably composite pads as described in detail below.

In order to maintain the grease absorbing pads 32 abutting respective sides 30 of the duct 24, and in engagement with the support frame 22 through adverse wind and weather conditions, U-shaped retaining clips 52 and tension cords 54 are employed as illustrated in FIG. 1. With reference to FIG. 4, the retaining clips 52 define an integral U-shaped channel 56 having a rod-engaging tab 58 and cord-engaging tab 60. The rod-engaging tab 58 has a rod-receiving aperture 62 for slidable receipt of a support rod 46 therethrough. A retaining clip 52 is inserted onto each end of each support rod 46 by sliding the clips 52 onto the end portion 48 of the support rod 46, with the end portion 48 of the support rod 46 sliding into the aperture 62 of the retaining clip 52.

Figure 8:
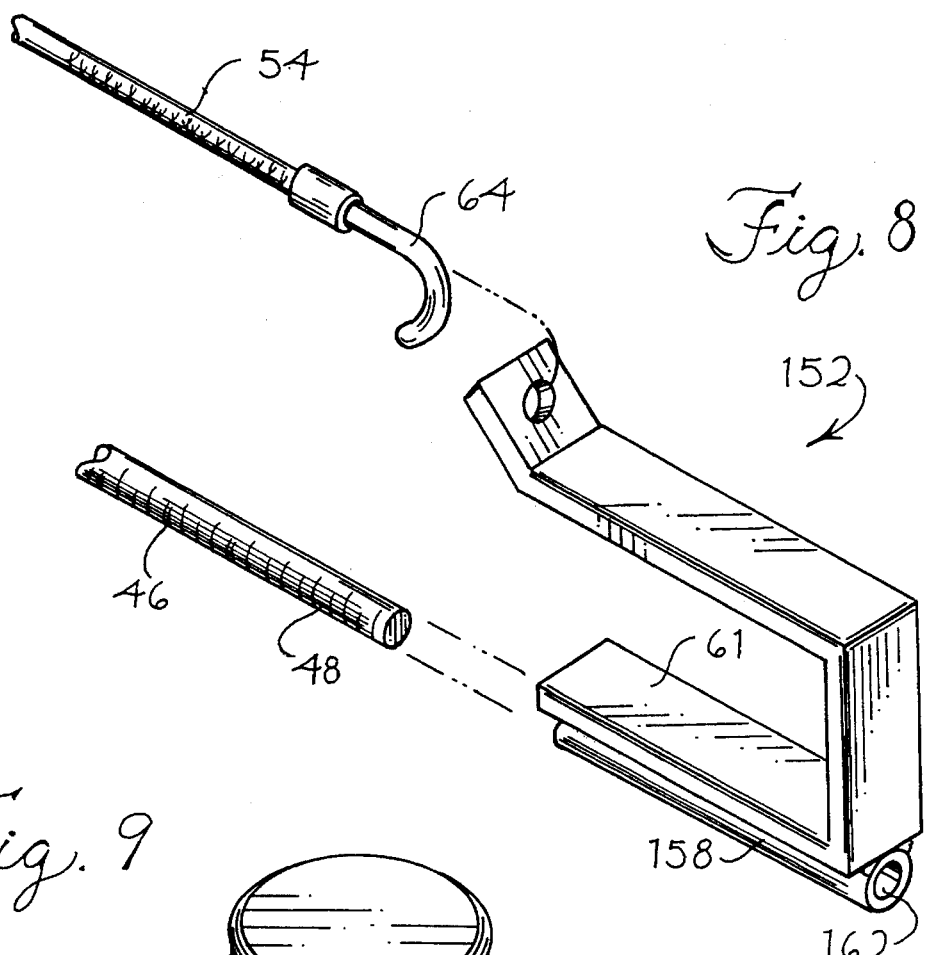
FIG. 8 is another embodiment of the retaining clip of FIG. 1.

Another retaining clip 152 is illustrated in FIG. 8. In this retaining clip 152, the rod engaging tab 58 and rod-receiving aperture 62 are replaced by an elongated tube 158 welded to the underside of the lower leg 61 of the U-shaped retaining clip. The tube 158 defines a rod-receiving aperture 162 through which the end portions 48 of the rods 46 are received as the retaining clips 52 are slid onto their respective rods 46.

Figure 9:
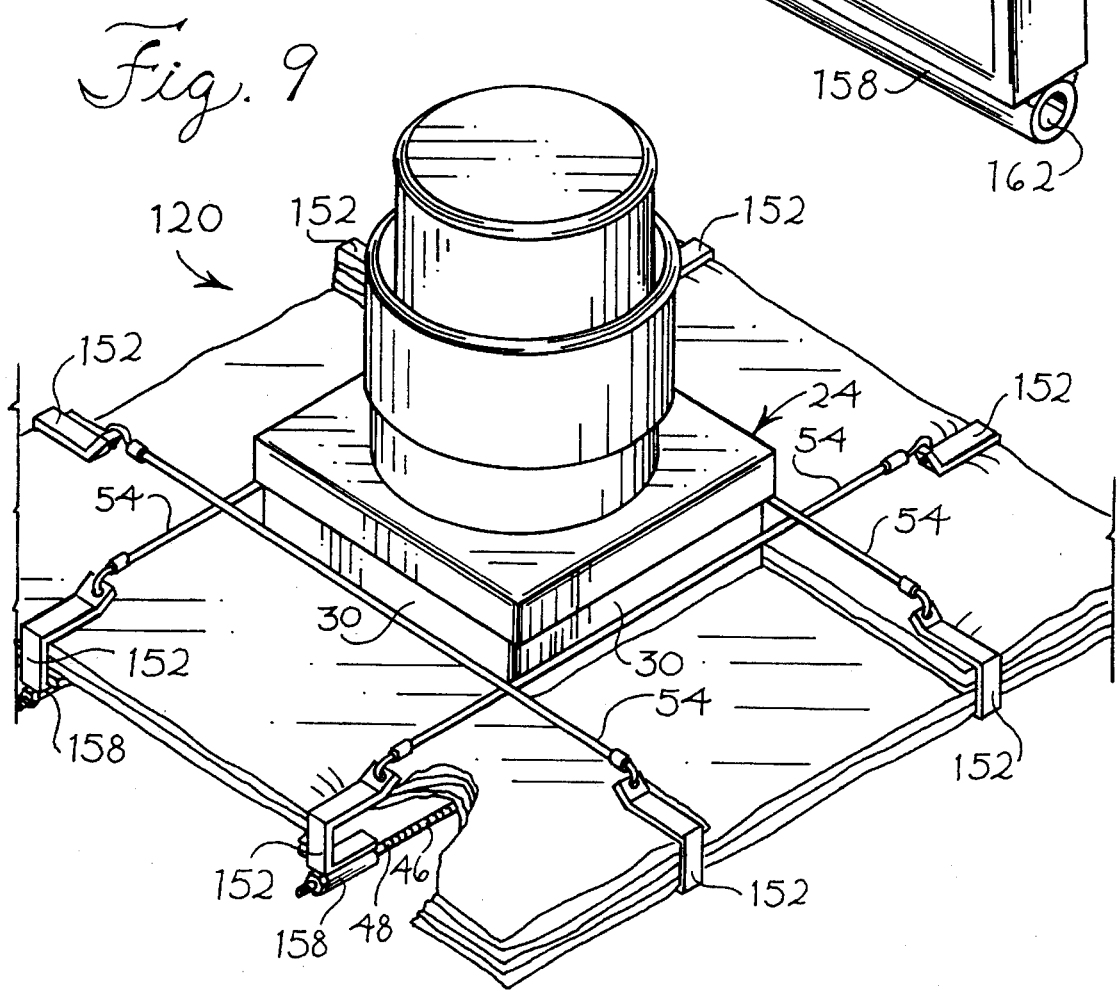
FIG. 9 is a perspective view of another filter assembly, employing the retaining clip of FIG. 8.

A grease filter assembly 120 employing the retaining clip 152 is illustrated in FIG. 9. The tubes 158 have been found to make sliding of the retaining clips 52 onto their respective rods 46 easier than the aforementioned rod engaging tab 58 and aperture 62. Also, the tubes 158 have been found to prevent hang-up in the sliding of the retaining clips 52 onto the support rods 46, allowing the retaining clips 52 to slide easily and relatively unimpeded along the rods to assure that the tension cords 54 pull the grease absorbing pads 32 into firm abutment with their respective sides 30 of the grease discharge duct 24. The retaining clips 52, which do not use a tube 158, have been found to occasionally get stuck on the threads at the end portions 48 of the support rods 46, which prevents the grease absorbing pads 32 from being pulled all the way into abutment with their respective sides of the grease discharge duct 24.

The outer edge portions 63 of the grease absorbing pads 32 are received within respective U-shaped channels 56 of the retaining clips 52. The retaining clips 52 are each disposed at overlapping pad portions with the edge portions 63 of both overlapping pads 32 being received within the U-shaped channel 56.

Accordingly, as best seen in FIG. 1, the grease absorbing pads 32 define a generally rectangular surface when supported on the support frame 22 and there are preferably two retaining clips 52 disposed on each side of the rectangle defined by the pads 32. For retainment of the pads 32 with the support frame 22 and biasing of the pads into abutment with respective sides 30 of the duct 24, pairs of oppositely disposed retaining clips 52 are inter-connected by tension cords 54. With continued reference to FIG. 1, following insertion of retaining clips 52 onto either end of a support rod 46, with the pair of overlapping portions of the grease absorbing pads 32 being received in the U-shaped channels 56 of the retaining clips 52, hooks 64 disposed at the either end of a tension cord 54 are engagingly received in respective hook-receiving apertures 66 of the cord-engaging tabs 60 of the retaining clips 52 to pull the respective pair of oppositely disposed retaining clips 52 toward one another. The extent of inward movement of the retaining clips 52 is limited by abutment of the inner edge of the pads with the duct sides 30 and abutment of the retaining clips 52 against the outer edges 63 of the pads 32. The tension cords 54 thereby to prevent the retaining clips 52 from sliding off of their respective rods 46 maintain the retaining clips 52 in engagement with respective support rods 46 and also serve to maintain a biasing force on the pads 46 holding the pads 46 in abutment with respective sides 30 of the duct 24. Good results have been provided by eight retaining clips 52 and four tension cords 54 retaining four grease absorbing pads 32 on four support rods 46 in the manner illustrated in FIG. 1.

Figure 5:
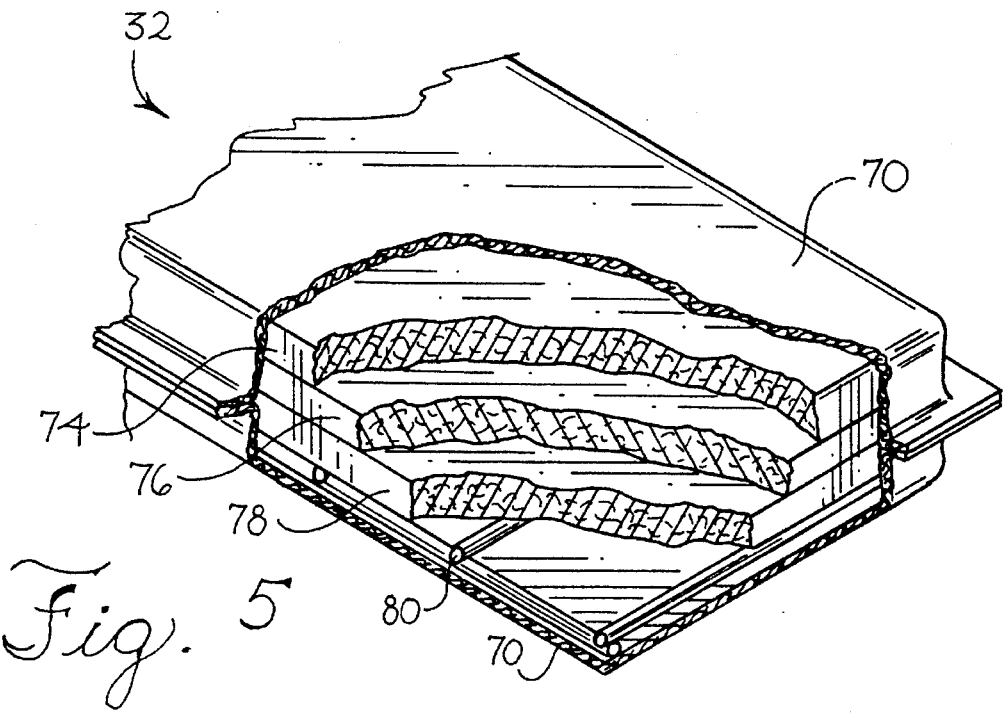
FIG. 5 is a cutaway perspective view of a grease absorbing pad of the grease filter assembly of FIG. 1 embodying various features of the present invention.
Figure 6:
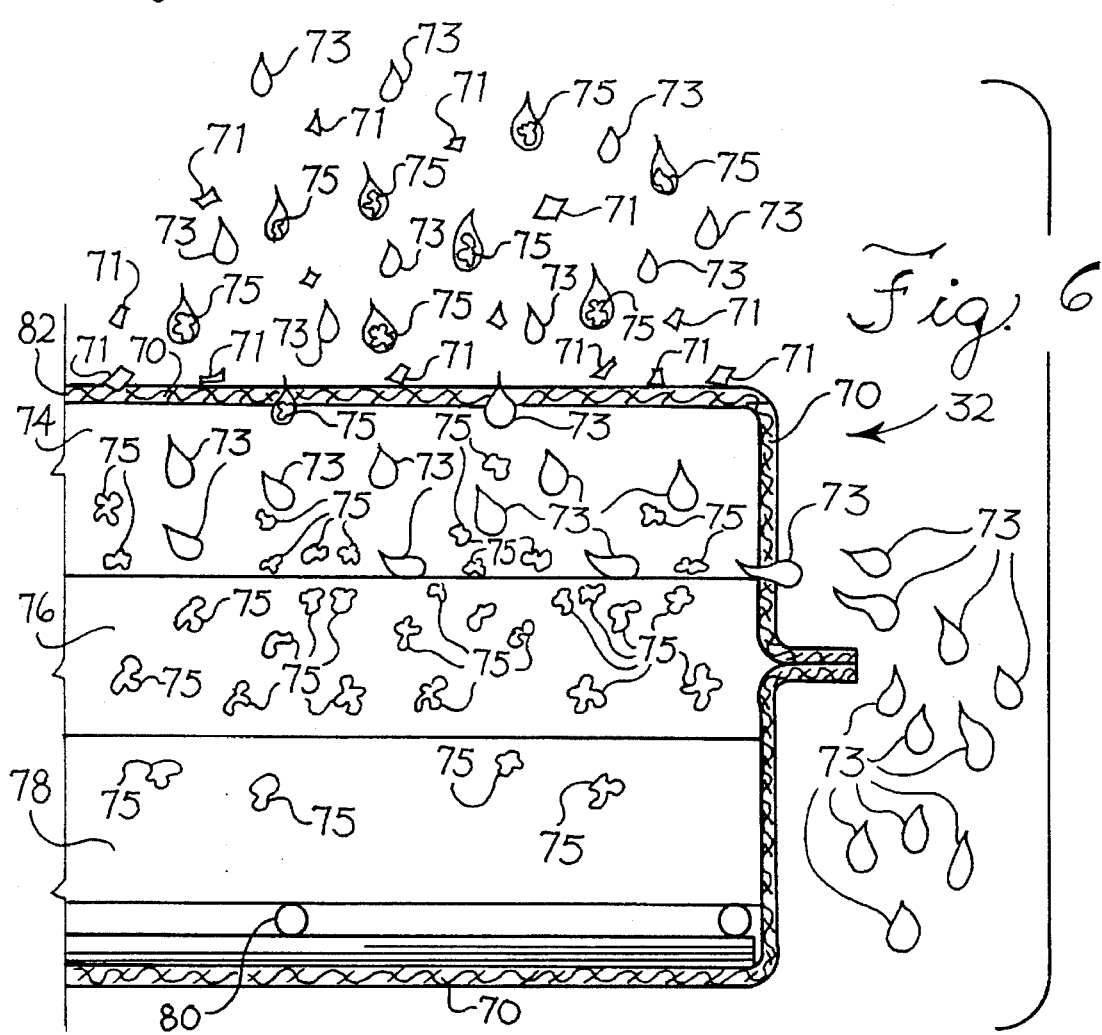
FIG. 6 is a cutaway side elevational view of a representative grease absorbing pad of the grease filter assembly of FIG. 1.

As mentioned briefly above, the preferred grease absorbing pads 32 are composite pads having the preferred construction which will now be described with reference to FIGS. 5 and 6. An outer porous layer 70 of material is provided for trapping particulate debris 71, which outer layer 70 is also permeable for passage of water 73 and liquid grease therethrough. The outer porous layer 70 of material is sealed on three sides, such as by heat sealing or the like, to create a pocket into which the remaining elements of the grease absorbing pads 32 are received. The composite grease absorbing pads 32 are comprised of a layer of grease absorbing and water passing material 74, a layer of water-repellent grease absorbing material 76, and a layer of plastic-backed grease absorbing material 78, all of which are supported on a wire frame 80. The pads and the wire frame 80 are disposed within the outer porous material 70.

The composite grease absorbing pad 32 of the present invention is suitable for absorbing air-borne grease discharged from a grease discharge vent, both when the pad 32 is exposed to precipitation together with the grease, and in the absence of precipitation. The composite pad 32 absorbs grease and passes any water discharged onto the pad, so that substantially no grease is discharged from the pad 32 onto the roof. More specifically, with specific reference to FIG. 6, in rainy conditions a mixture of water 73 and grease 75, which may also include some particulate 71, is dispensed onto the grease absorbing pad 32. The grease and water mixture first passes through the upper layer 82 of the outer porous material 70 which filters out particulate 71, but allows both the water 73 and the grease 75 to pass substantially completely therethrough.

The water 73 and grease 75 mixture then passes through the layer of grease absorbing and water passing material 74 which absorbs a substantial portion of the grease 75, but allows the water 73 to pass substantially completely therethrough. Hence, the mixture of water and grease passed through the layer of grease absorbing and water passing material 74 has a significant portion of the grease 75 absorbed by the grease absorbing material 74 with substantially all of the water 73 and a portion of the grease passed completely through the material 74.

The water and grease then encounter the layer of water-repellent grease absorbing material 76 which absorbs grease from the grease and water mixture but blocks substantially all of the water 73 to prevent the water 73 from passing through the water-repellent grease absorbing material 76. Hence, the water-repellent grease absorbing material 76 redirects the direction of flow of the water which exits the layer of grease absorbing material 74 to run horizontally to the periphery of the pad 34 and roll off the pad. Any grease mixed in with the water which exits the layer of grease absorbing material 74 also runs horizontally along the upper surface of the water-repellent grease absorbing material 76, whereby the water and grease mixture is in contact with both the grease absorbing material 74 and the water-repellent grease absorbing material as its flows outwardly to the periphery of the pad. The redirecting of the flow outwardly to the periphery of the composite pad 32 provides prolonged contact between the water and grease mixture 73 and 75 and both of the grease absorbing materials 74 and 76, to provide increased absorption of the grease.

The pads are made sufficiently large that substantially all of the grease 75 is absorbed by the grease absorbing materials 74 and 76 by the time the mixture has run to the periphery of the pads. Accordingly, only water remains unabsorbed by the pad 34, and the water 73 runs off the sides of the layer of water-repellent grease absorbing material 76 and is allowed to fall onto the roof. Since virtually no grease remains in the water which falls onto the roof, deterioration of the roofing material is significantly reduced.

A product sold by DuPont Corporation under the tradename "TYWIK" has been found to be well suited for use as the layer of grease absorbing and water passing material 72. A polypropylene product sold by New Pig Corporation of Tipton, Pa. under the tradename "MAT 403" has been found to be well suited for use as the layer of water-repellent grease absorbing material 76. However, a wide variety of other suitable materials are readily available, and the invention is not limited to the particular materials discussed above.

As a fail-safe measure, a layer of plastic-backed grease absorbing material 78 may be provided and disposed beneath the layer of water-repellent grease absorbing material 76. Should the layer of water-repellent grease absorbing material 76 fail to be timely changed, and an amount of grease in excess of the predetermined amount of grease which the layer of water-resistant grease absorbing material is capable of absorbing, be allowed to accumulate, the layer of water-repellent grease absorbing material 76 may not be able to absorb any more grease. The extra layer of plastic-backed grease absorbing material 78 in contact with the layer of water-repellent grease absorbing material 76 would then absorb the excess grease. The plastic backing of the layer of plastic-backed grease absorbing material 78 is also a precautionary measure which serves to block water from exiting downwardly through the lower layer 78 and onto the roof in the event water somehow managed to come into contact with the layer of plastic-backed grease absorbing material 78. A product sold by New Pig Corporation under the tradename "MAT 285" has been found to be well suited for use as the layer of plastic-backed grease absorbing material 78.

It will now be appreciated that in the grease absorbing pad 74, all of the layers of grease absorbing materials, including the layer of grease absorbing and water passing material 74, the layer of water-repellent grease absorbing material 76, and the layer of plastic-backed grease absorbing material 78, are stacked one upon the other and supported upon a wire frame 80. Hence, the wire frame 80 must support the load of the grease absorbing material layers, and in many instances a significant amount of grease and water as well. Therefore, the wire frame 80 should be formed of wires of sufficiently large gauge to adequately support the aforementioned grease and water soaked pads, particularly at the corners at which the grease absorbing pads 74 overlap and there is no support directly beneath the pads.

This pad construction is inexpensive to produce, lightweight, lends itself to easy engagement and removal from the support frame 22, and is readily disposable following a predetermined amount of grease absorption. No disassembly of the support frame 22 or composite pads 32 is required for periodic replacement of soiled pads 32.

Since the pads 32 rest upon the support frame 22, and may extend outwardly of the rods 46 of the support frame 22, it is not necessary to cut the pads 32 to accommodate differently sized ducts 24. This presents a significant advantage over the aforementioned patented roof-mounted construction in which the pads are required to be completely disposed within the space between an outer frame and the periphery of the duct, requiring that the pads be shaped to conform to the configuration of the space between the frame and the duct. This necessitates different pad shapes and sizes for each differently shaped and differently sized duct. Contrarily, in accordance with the grease filter assembly 20 of the present invention, only a single size pad and frame is required for accommodating a wide variety of different sizes and shapes of ducts.

A complete changeover of pads to replace soiled pads with new pads is carried out by removing the tension cords 54, sliding the retaining clips 52 off their respective rods 46, removing the soiled pads 46, positioning clean pads 46 on the support frame 22, sliding the retaining clips back onto their respective rods 46, and attaching the tension cords 54. The entire pad replacement process has been found to take only approximately five minutes. The pad changeover can be carried out rapidly and completely without the aid of tools. The pads 46 are preferably disposable, and the soiled pads 46 may be discarded following their removal from the support frame 22. As discussed above, the support frame 22 remains clamped in place throughout the repeated interchanging of pads 46.

Figure 7:
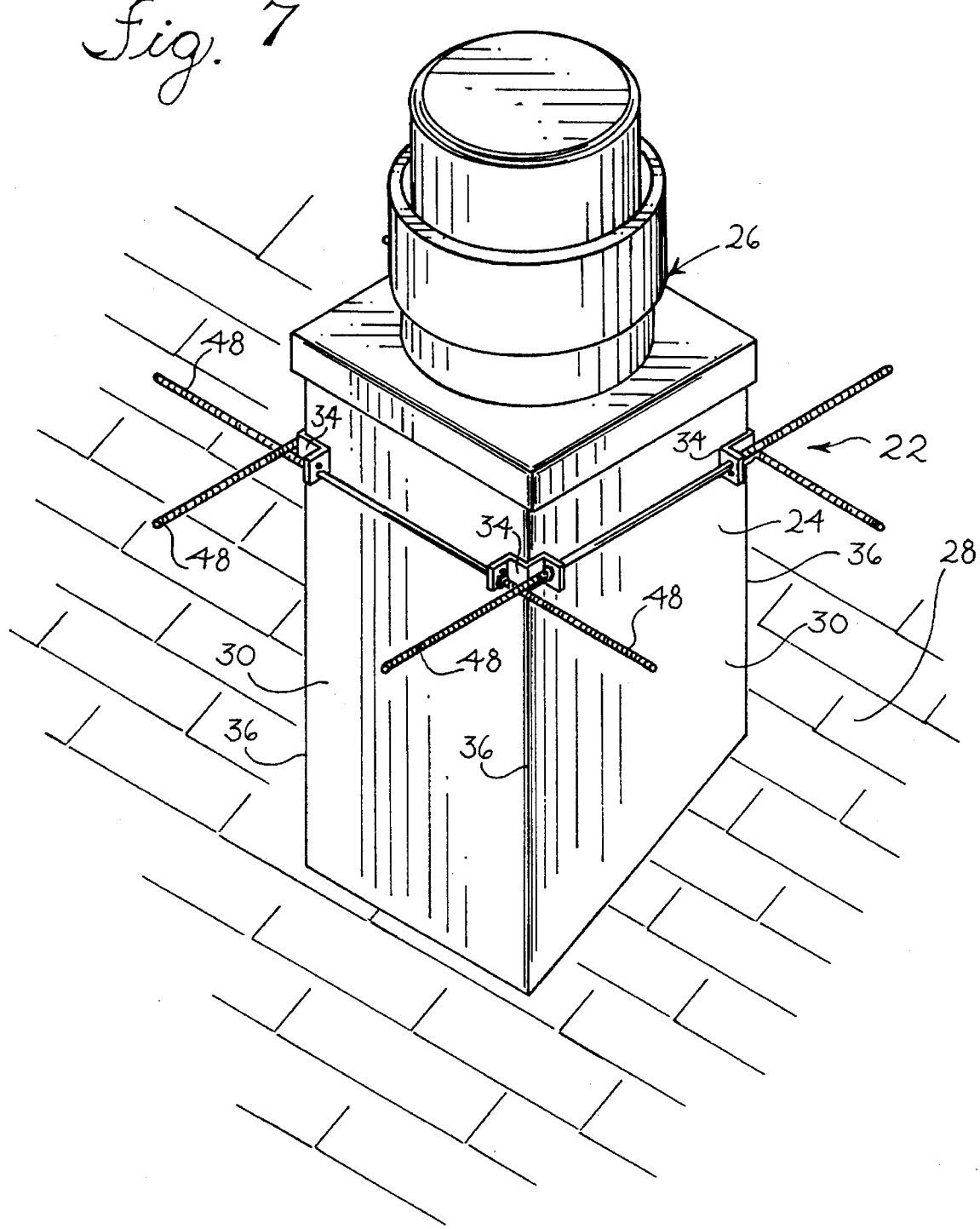
FIG. 7 is a perspective view of a support frame embodying various features of the present invention shown mounted to a tall grease discharge vent duct.

Also, since the support frame 22 mounts to the duct 24 of the discharge vent 26 rather than the roof 28, the shape, angle and type of roof is immaterial to secure mounting of the support frame 22 and proper operation of the grease filter assembly 20. One of the advantages of the duct-mounted grease filter assembly 20 of the present invention over roof-mounted grease filter assemblies of the prior art is illustrated in FIG. 7 which shows a roof 28 which is significantly angled with respect to the duct 24. Current roof-mounted structures are not suitable for roof configurations such as that shown in FIG. 7. Since the support frame 22 of the grease filter assembly 20 of the present invention mounts to the duct 24 in spaced relation from the roof 28, it is equally well suited for angled roof configurations as well as flat roofs. Also, with a grease discharge vent 26 such as that of FIG. 7 in which the duct 24 extends a significant distance upwardly from the roof 28, mounting the assembly at the roof 28, as required with prior art structures, leaves the grease absorbing materials spaced too far from the grease discharging end of the vent 26 to catch discharged grease before it blows away from the pads; whereas the grease filter assembly 20 of the present invention is mountable directly beneath the grease discharge end of the vent 26 to catch the discharged grease before it blows away. Further, standing water on the roof 28 is detrimental to roof-mounted structures, but since the grease filter assembly 20 of the present invention mounts to the duct 24 of the grease discharge vent 26 in spaced relation from the roof 28, standing water on the roof 28 does not adversely affect the operation and integrity of the grease filter assembly 20.

While the invention has been described with reference to specific embodiments, it will be understood to those skilled in the art that various changes and modifications may by made, and equivalents may be substituted for elements thereof, without departing from the scope of the invention. For instance, while the description of the invention is directed to rectangular ducts 24, the support frame 22 is engageable to circular or other duct shapes, and manifestly the grease filter assemblies 20 of the present invention are not limited to application to any particular duct shape or size. It is intended that the invention not be limited to the particular embodiments disclosed herein, but that the invention will include all embodiments falling within the scope of the appended claims.

What is claimed is:

1. A grease filter assembly for absorbing grease discharge from a grease discharge vent having a duct extending from a roof, the assembly comprising:

a support frame for mounting to the duct of the grease discharge vent in spaced relation above the roof and below the grease discharge vent and having a portion extending outwardly from at least one side of the duct;

at least one pad formed from grease absorbing material; and retaining means for retaining the grease absorbing pad on the outwardly extending portion of the support frame, whereby the grease absorbing pad catches grease discharged from the discharge duct.

2. A kit for forming a grease filter assembly for absorbing grease from a grease discharge vent having a duct, the kit comprising:

a plurality of support rods for being positioned generally horizontally adjacent respective sides of the discharge vent duct, the support rods being greater in length than the respective sides of the duct against which they are to be positioned;

a plurality of mounting brackets each having a rod-receiving aperture for receiving a respective rod therethrough for supporting the rods adjacent their respective sides of the duct;

fastening means for fastening the mounting brackets to the support rods for clamping of the mounting brackets to the discharge vent duct to maintain the support rods adjacent their respective sides of the discharge vent duct;

a plurality of grease absorbing pads freely supportable on top of said support rods and positionable adjacent respective sides of the discharge vent duct; and pad retaining means for retaining the plurality of pads on the support rods adjacent respective sides of the discharge vent duct.

3. A grease filter assembly for absorbing grease from a grease discharge vent having a duct, the assembly comprising:

a support frame for mounting to the duct of the grease discharge vent, said support frame comprising:
   a plurality of support rods for being positioned generally horizontally adjacent respective sides of the discharge vent duct, the support rods being greater in length than the respective sides of the duct against which they are to be positioned; and a plurality of mounting brackets having means for engaging respective support rods for clamping of the mounting brackets and support rods to the discharge vent duct to support the rods adjacent their respective sides of the duct;

a plurality of grease absorbing pads freely supportable on top of said support frame and positionable adjacent respective sides of the discharge vent duct; and pad retaining means for retaining the plurality of pads on the support frame adjacent respective sides of the discharge vent duct.

4. A grease filter assembly in accordance with claim 3 in which the sides of the duct form corners with each other and the rods have end portions which cross one another at the corners of the duct to provide a supporting grid comprising the end portions of the crossing rods at each of the corners of the duct, and the grease absorbing pads are supportable on the supporting grid of the support frame.

5. A grease filter assembly in accordance with claim 3 in which the discharge vent duct extends generally upwardly from a roof of a structure and said support frame has means for clamping to said discharge vent in spaced relation from the roof.

6. A grease filter assembly in accordance with claim 3 in which the pad retaining means comprises a plurality of retaining clips each defining a pad-receiving channel for receiving respective pads and each having means for engagement with a respective one of said support rods.

7. A grease filter assembly in accordance with claim 6 in which the means for engagement of each of the retaining clips with respective support rods comprises an aperture in each of the retaining clips for engageably receiving a respective one of said support rods.

8. A grease filter assembly in accordance with claim 6 in which at least one pair of the retaining clips are disposed on opposite sides of the discharge vent and the pad retaining means further comprises tensioning cords engageable with the oppositely disposed pair of retaining clips for pulling said pair of retaining clips toward one another to prevent the retaining clips from sliding off their respective support rods and to maintain the pads received in the channels of the retaining clips in abutment with their respective sides of the discharge vent.

9. A grease filter assembly in accordance with claim 3 in which the mounting brackets each have a pair of vertically offset apertures for receiving respective rods.

10. A grease filter assembly in accordance with claim 3 in which the mounting brackets are disposed at respective corners of the discharge vent duct and the mounting brackets each have a pair of flanges disposed to extend substantially perpendicularly from respective, adjacent sides of the discharge vent duct disposed on either side of the corner, and the fastening means for fastening the mounting brackets to the support rods comprises rod-receiving apertures formed in the flanges of the mounting bracket.

11. A grease filter assembly in accordance with claim 3 in which the grease absorbing pads are composite pads suitable for use with a grease and water mixture, the grease absorbing pads comprising:

a layer of grease absorbing and water passing material having means for absorbing a substantial portion of the grease of said grease and water mixture and allowing substantially all of the water of the grease and water mixture to pass therethrough; and a layer of water-repellent grease absorbing material disposed directly beneath the layer of grease absorbing and water passing material having means for absorbing substantially all of the grease not absorbed by the layer of grease absorbing and water passing material and preventing substantially all of the water from passing therethrough, so that the grease and water mixture passed through the layer of grease absorbing and water passing material flows generally parallel and between the layer of grease passing and water passing material and the layer of water-repellent grease absorbing material for increased contact time of the grease and water mixture with both said layer of grease absorbing and water passing material and said layer of water-repellent grease absorbing material to effect absorbing of substantially all of the remaining grease from said grease and water mixture.

12. A grease absorbing pad in accordance with claim 11 further comprising:

a layer of porous material disposed above the layer of grease absorbing and water passing material for filtering out particulate; and a wire frame disposed beneath the layer of water-repellent grease absorbing material for providing structural rigidity to the pads.

13. A grease filter assembly for absorbing grease discharged from a grease discharge vent having a rectangular duct extending upwardly from a roof to prevent grease accumulation on the roof, the assembly comprising:

four support rods, each for being positioned adjacent a respective side of the duct;

four mounting brackets each mountable to a respective corner of the duct and each having a pair of flanges for extending generally perpendicularly from adjacent walls of the duct on either side of the corner, with each of the flanges having an aperture for receipt of a respective support rod, the mounting brackets providing a pair of flanges extending generally perpendicularly from each of the walls of the duct when the mounting brackets are each mounted to respective corners of the duct, and the support rods each being supported adjacent a respective side of the duct by receipt of the support rods through the apertures of each of the pairs of flanges extending from respective sides of the duct;

the support rods each being longer than the width of their respective duct sides, with the portions of the rods extending beyond adjacent duct sides crossing one another at each of the duct corners;

four grease absorbing pads each supportable adjacent a respective side of the duct on respective pairs of end portions of the rods extending outwardly from the respective duct sides;

eight retaining clips each engageable with a respective end portion of the support rods and each having a channel for receiving respective support pads; and four tension cords each engageable with the respective pair of retaining clips engaged at either end of the support rods to pull the pairs of retaining clips toward one another to bias the pads into abutment with respective sides of the duct and prevent the retaining clips from falling off their respective support rods.

14. A support frame for a grease filter assembly for supporting a plurality of grease absorbing pads in spaced relation from a roof through which a grease discharge vent duct extends, the support frame comprising:

a plurality of support rods for being positioned generally horizontally adjacent respective sides of the discharge vent duct;

a plurality of mounting brackets each having means for mounting to respective corners of the discharge vent duct and each having a pair of flanges disposed to extend substantially perpendicularly from respective, adjacent sides of the discharge vent duct disposed on either side of the respective corner, with the flanges each having a rod-receiving aperture for engageably receiving respective support rods for supporting the support rods adjacent their respective sides of the discharge vent duct; and the support rods being greater in length than their respective sides of the discharge vent duct and having end portions, with the end portions of the support rods disposed adjacent contiguous sides of the discharge vent duct extending beyond their respective discharge vent duct sides and crossing one another, with the crossing end portions of the support rods defining supporting grids at each of the corners of the discharge vent duct for supporting the grease absorbing pads thereon.

15. A support frame in accordance with claim 14 in which the flanges of the mounting brackets each have a pair of vertically offset apertures for engageably receiving respective support rods in vertically offset relation at the corners of the discharge vent duct.

16. A support frame in accordance with claim 14 in which the support rods are threaded and the support frame further comprises nuts threadably engageable with either end of the support rods for maintaining engagement of the support rods with their respective mounting brackets.

17. The assembly of claim 1 including mounting brackets abutting the duct with the support frame mounted adjacent to the duct by the brackets while leaving the duct intact.

* * * * *